United States Patent [19]

Stone

[11] Patent Number: 4,637,627
[45] Date of Patent: Jan. 20, 1987

[54] VEHICLE SPRING SUSPENSION ARRANGEMENT

[75] Inventor: Richard H. Stone, Watford, England

[73] Assignee: Leyland Vehicles Limited, Leyland, England

[21] Appl. No.: 580,896

[22] Filed: Feb. 16, 1984

[30] Foreign Application Priority Data

Feb. 17, 1983 [GB] United Kingdom ............... 8304402

[51] Int. Cl.⁴ ............................................. B60G 5/00
[52] U.S. Cl. .................. 280/686; 180/24.02; 280/718
[58] Field of Search ............... 280/718, 720, 686, 104; 180/24.02

[56] References Cited

U.S. PATENT DOCUMENTS 2,361,323 10/1944 Seghers ............................... 280/718
2,864,454 12/1958 LaBelle .
3,257,124 6/1966 Mendez ........................... 180/024.02

FOREIGN PATENT DOCUMENTS 7504297 7/1975 Fed. Rep. of Germany .
2725599 12/1978 Fed. Rep. of Germany .
3119022 12/1982 Fed. Rep. of Germany .
1106515 12/1955 France .
1184376 10/1956 France .
2040182 4/1969 France .
2007105 1/1970 France .
469991 8/1937 United Kingdom .
1122358 8/1968 United Kingdom .
2034644 6/1980 United Kingdom .
645860 2/1979 U.S.S.R. .

OTHER PUBLICATIONS

Translation of French Patent Appln. No. 2,007,105, "Suspension System for Motor Vehicles, In Particular Three Axle Vehicles".

Primary Examiner—Henry Bennett
Attorney, Agent, or Firm—Hayes, Davis & Soloway

[57] ABSTRACT

A vehicle such as a 6×2 tractor having at least three axles is provided with a novel leaf spring suspension (1) for its middle axle. When the load, imposed on the chassis by a semi-trailer, exceeds a predetermined threshold, the free, rear, end of the leaf spring (1) engages the under-surface of the upper portion of a slipper bracket (4) attached to the chassis, and the middle axle takes a proportion of the load. With loads below the threshold, the free end drops through a vertical "air gap" and is held by a lower supporting arm on the slipper bracket, the middle axle being unloaded. The rear, driving, axle is thus more heavily loaded whenever the vehicle is part-laden, ensuring greater traction.

12 Claims, 4 Drawing Figures

VEHICLE SPRING SUSPENSION ARRANGEMENT

The invention relates to a mechanical spring suspension arrangement for vehicles with at least three axles, and in particular to an arrangement which regulates the relative axle loading.

With trucks comprising a 3-axle tractor carrying a semi-trailer on a "fifth-wheel" turntable, for example, the tractor is designed to be driven with any load from zero to a predetermined maximum. With only one driving axle, it is desirable to maintain a substantial proportion of the imposed load on the rear driving axle, in order to obtain good traction, and it has been proposed to regulate automatically the proportions carried by the middle axle and rear axle by means of the suspension system. Automatic air suspension systems, responsive to the front and rear-axle loadings to regulate the middle-axle loading, have been proposed, but these are complex and costly. It is therefore an object of the invention to provide a simple mechanical suspension for ensuring that a specific axle, in a vechile having three or more axles, becomes loaded only when the imposed load on the vehicle exceeds a certain threshold.

The invention consists in a vehicle having a chassis supported by at least two primary axles and one secondary axle, and an elongate suspension member arranged lengthwise of the vehicle at right-angles to the secondary axle, to which it is coupled, one end of the suspension member being coupled to the chassis and restrained from relative vertical movement, wherein a section of the suspension member remote from the said end, and an associated portion of the chassis, are adapted so that the said section engages that portion of the chassis, and the suspension member thereby resiliently supports the chassis on the secondary axle, only when a load imposed on the chassis exceeds a predetermined threshold, the suspension member dropping out of supportive engagement with the chassis and permitting all vehicle wheels to remain in ground contact when the imposed load is below the threshold.

In a preferred vehicle, a spring supporting the chassis on the rearmost primary axle has a softness similar to that of the said suspension member, and is preferably slightly softer.

The preferred suspension member is a leaf spring, whose central portion is generally thicker than its end and is coupled to the secondary axle. In the preferred vehicle, the leaf spring at one end is mounted by a bushing on the chassis, and supports the chassis at the other, free end through a slipper bracket. The slipper bracket has a controlled vertical "air gap" through which the free end drops, when the load falls below the threshold, to rest on a lower arm of the bracket. The bracket ideally also provides lateral location of the spring. In one example, a "6×2" tractor unit having three axles, only the rear axle being driven, the middle axle is the secondary axle, and with light imposed loads the front and rear (primary) axles alone are loaded. A leaf spring is mounted at the front end on a point on the chassis between the front and middle axles, and engages a slipper bracket at its rear end, just in front of the rear axle but behind the point of imposition of the load through the so-called "fifth-wheel" platform. In order that the invention may be better understood, this example of the application of the invention will now be described in detail, with reference to the accompanying drawings, in which:

Figure 1:
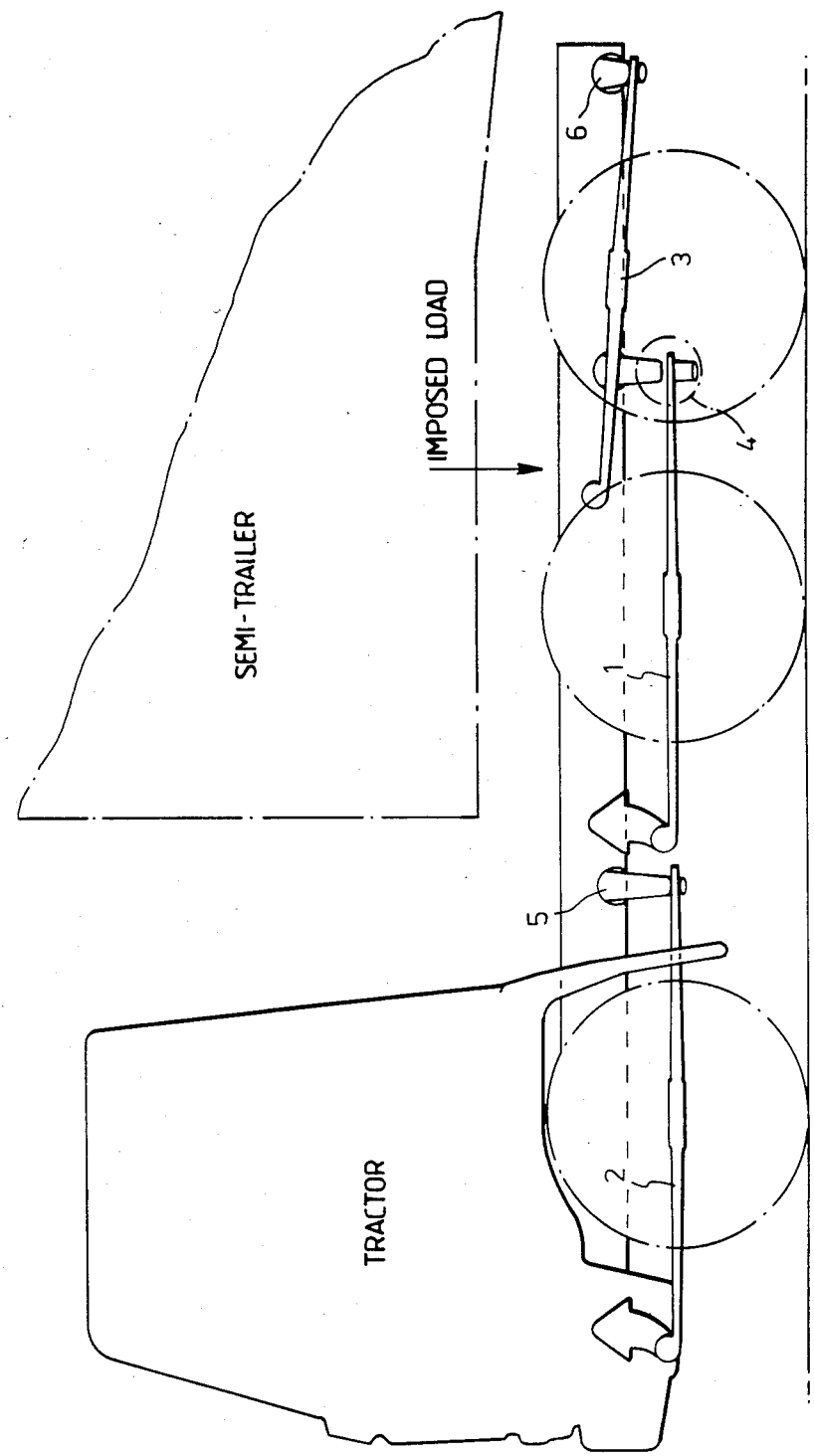
FIG. 1 is a schematic diagram of the tractor unit carrying a semi-trailer on its "fifth-wheel" platform, with a suspension embodying the present invention.

FIG. 1 shows a 6×2 tractor unit, driven by the rear axle only. A semi-trailer imposes a load on the tractor's chassis through a "fifth-wheel" platform, shown schematically as an arrow in the figure. The front and rear axle suspensions 2, 3 are conventional leaf springs, the front ends mounted by bushings on the chassis and the rear ends mounted in slipper brackets, the rear ends being permanently in contact with the under-surfaces of the upper portions of the slipper brackets, under all conditions of loading. The middle axle supports a leaf spring 1 which, although mounted conventionally at the front end by a bushing, is held by a slipper bracket 4 at its rear end in a manner which allows vertical movement through an "air-gap". As usual, there are two leaf spring suspensions for each axle, one close to each wheel.

Figure 2:
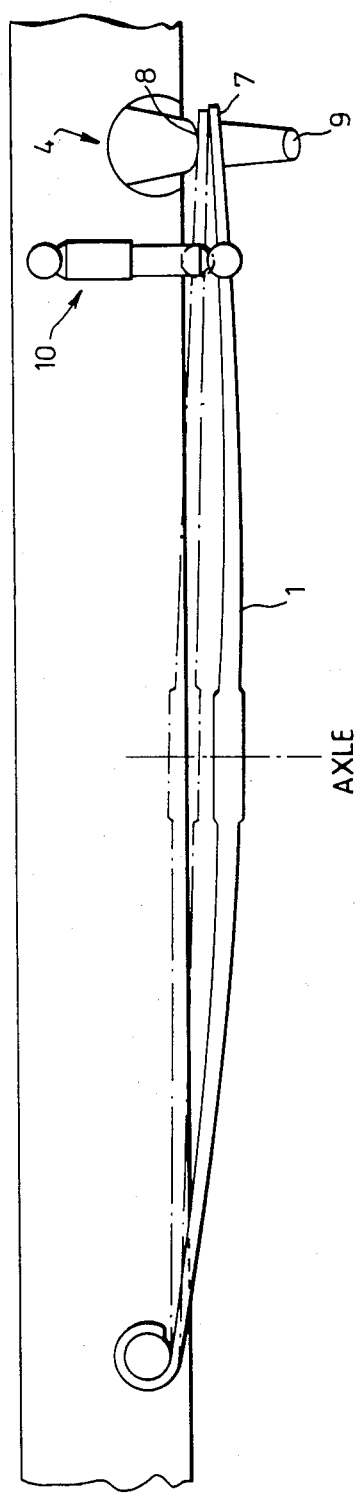
FIG. 2 shows the middle (secondary) axle suspension of FIG. 1 in greater detail.
Figure 3:
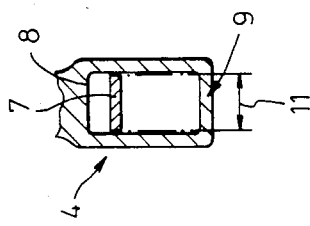
FIG. 3 illustrates the slipper bracket, and is an end elevation from the right of part of the view shown in FIG. 2.

The middle axle suspension arrangement is shown more clearly in FIGS. 2 and 3. Loads below a predetermined threshold are supported almost entirely by the front and rear axles, referred to here as the primary axles. The ground weight at the secondary axle is then only the weight of the axle, i.e. about 8.5% of the unladen vehicle weight. Under all loading conditions and road surfaces, all vehicle wheels remain in ground contact. With the vehicle unladen, the leaf spring 1 coupled to the middle, secondary axle, is unstressed, and if free to drop to a position such as is shown in unbroken lines in FIG. 2, where the wheels on the secondary axle rest on the ground. The downwards travel of the free end 7 is limited by a lower arm 9 of the slipper bracket 4 which serves as a structural support to the remainder of the bracket 4. The suspension would however function satisfactorily without the arm 9. In order to avoid possible clattering with light loads, a dashpot damper 10 or other such device may be provided to dampen the relative movement of the leaf spring 1 and chassis, or other stationary object. When the imposed load approaches the predetermined threshold, the chassis lowers onto the middle axle gradually closing the air gap until the leaf spring engages the undersurface 8 of the upper portion of the slipper bracket 4. The air gap for the unladen vehicle on level ground is typically about 10 cm. The lower arm 9 is conveniently situated below this position so as not to interfere with normal operation of the suspension. With imposed loads exceeding the threshold, the middle axle supports a proportion of the load through the leaf spring 1, in a position such as that shown in broken lines in FIG. 2.

We have discovered that the ride comfort is satisfactory even when the middle leaf spring 1 has a softness (spring constant) similar to those of the other springs 2, 3; in fact in the preferred embodiment the middle spring 1 is harder, the spring constants being 21.5 kg.mm$^{-1}$, 56 kg.mm$^{-1}$ and 49 kg.mm$^{-1}$ for the front, middle and rear springs 2, 1, 3 respectively.

Lateral location of the leaf spring 1 at its rear end is provided also by side walls of the slipper bracket 4, as shown in FIG. 3. The side walls, together with the surface 8, form an inverted "U" shape. Lateral movement 11 is resisted by the bracket, but further lateral support may be provided in either direction by means of Panhard rods.

Figure 4:
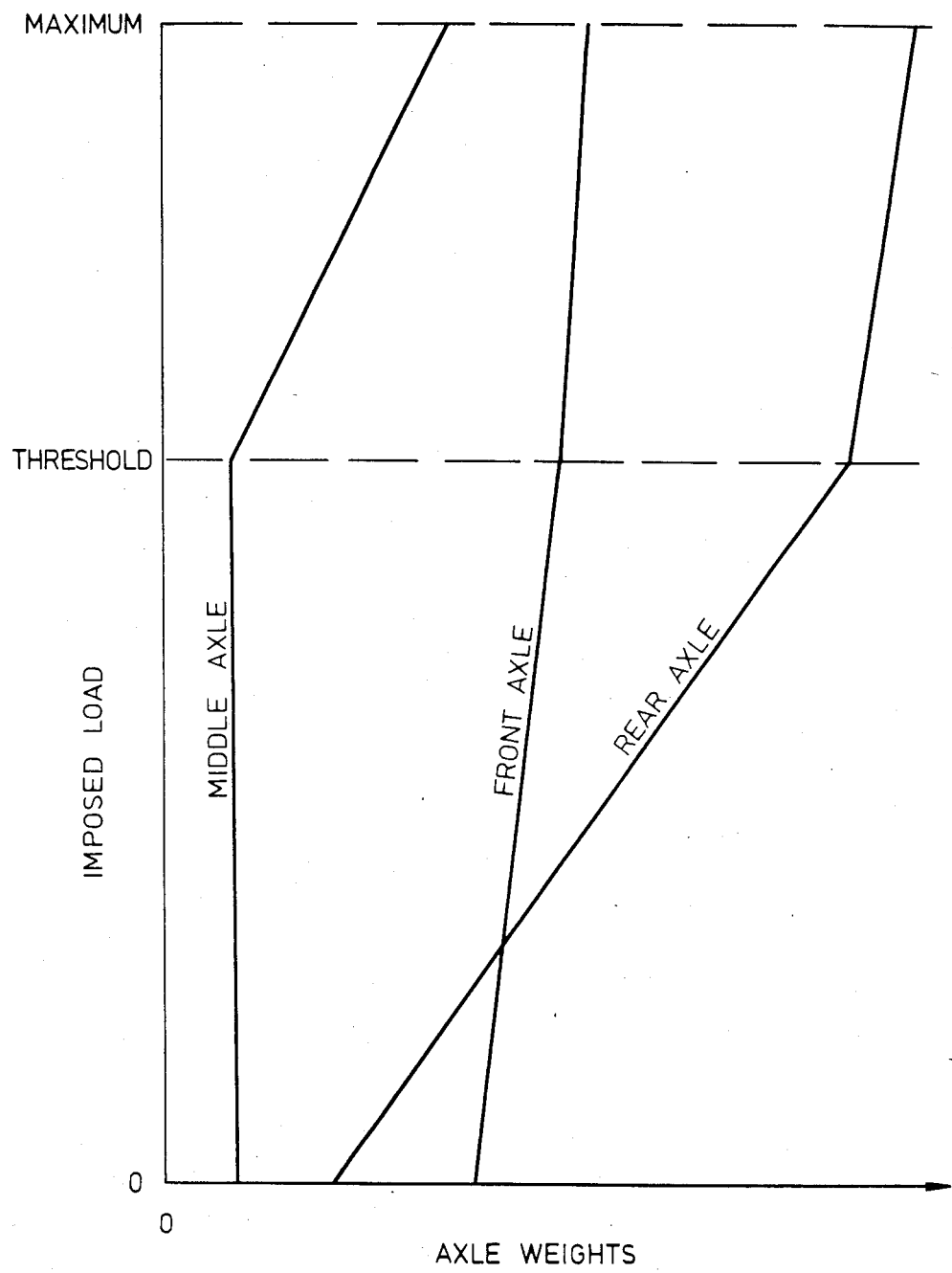
FIG. 4 is a graph of the imposed load on the chassis against the ground load on each of the three axles of the vehicle of FIGS. 1 to 3.

The variation of the ground loads on each axle with overall load imposed on the chassis is shown in FIG. 4. The threshold imposed load, at which the middle axle begins to increase its load, is indicated as "threshold". Beyond this, all axle loadings increase steadily to their maximum designed loads corresponding to a "maximum" imposed load. If there were no air gap, and continuous loading of the middle axle, the rear driving axle would have a correspondingly reduced load, with reduced traction on the rear wheels.

A further advantage of the air gap is that manufacturing tolerances in the spring camber (shape), which may be around ±6 mm. can be compensated for by adjustment of the size of the air gap in the factory, to give the correct loading threshold.

The leaf spring 1 is illustrated as a single spring, but double or multiple leaves superimposed on each other can be used to obtain alternative stiffness if required.

Although we have described a leaf spring arrangement, we envisage that a good traction ratio in part-laden conditions could also be achieved with the present invention by means of a suitable rigid beam with coil springs, torsion bars, rubber springs or any other suitably resilient member. The resilient member should be adapted to support the rigid beam resiliently, upon the closing of a controlled vertical "air gap". The free end of the beam or indeed any part of the beam distant from the end fixed to the chassis, would then support part of the chassis through the resilient member, with an air gap between the resilient member and either the chassis or the beam.

I claim:

1. A wheeled vehicle having a chassis supported by at least two primary axles and one secondary axle, and an elongate suspension member arranged lengthwise of the vehicle at right-angles to the secondary axle, to which it is coupled, one end of the suspension member being coupled to the chassis and restrained from relative vertical movement, characterized in that a section of the suspension member remote from the said end, and an associated portion of the chassis, are adapted so that the said section engages that portion of the chassis, and the suspension member thereby resiliently supports the chassis on the secondary axle, only when a load imposed on the chassis exceeds a predetermined threshold, the suspension member dropping out of supportive engagement with the chassis and permitting all vehicle wheels to remain in ground contact when the imposed load is below the threshold, wherein the suspension member is a leaf spring coupled at its middle region to the secondary axle, the said section of the suspension member is the other, free, end of the leaf spring which engages an adapted portion of the chassis with imposed loads over the threshold and the leaf spring is mounted on the chassis at the free end by a slipper bracket having an upper portion for engaging the leaf spring when under load, and a lower portion for supporting the leaft spring when it has dropped out of engagement, the upper and lower portions being separated by a controlled vertical air gap wider than the thickness of the free end of the leaf spring.

2. A wheeled vehicle having a chassis supported by at least two primary axles and one secondary axle, and an elongate suspension member arranged lengthwise of the vehicle at right-angles to the secondary axle, to which it is coupled, one end of the suspension member being coupled to the chassis and restrained from relative vertical movement, characterized in that a section of the suspension member remote from the said end, and an associated portion of the chassis, are adapted so that the said section engages that portion of the chassis, and the suspension member thereby resiliently supports the chassis on the secondary axle, only when a load imposed on the chassis exceeds a predetermined threshold, the suspension member dropping out of supportive engagement with the chassis and permitting all vehicle wheels to remain in ground contact when the imposed load is below the threshold, wherein the said suspension member has a softness (spring constant) similar to that of a spring supporting the chassis at the rear axle, the primary axles are at the front and rear of the vehicle, the secondary axle is a middle axle and the said end of the suspension member restrained from relative vertical movement is its front end and the said section of the suspension member supports the chassis at a point between the middle and rear axles.

3. A wheeled vehicle having a chassis supported by at least two primary axles and one secondary axle, and an elongate suspension member arranged lengthwise of the vehicle at right-angles to the secondary axle, to which it is coupled, one end of the suspension member being coupled to the chassis and restrained from relative vertical movement, characterized in that a section of the suspension member remote from the said end, and an associated portion of the chassis, are adapted so that the said section engages that portion of the chassis, and the suspension member thereby resiliently supports the chassis on the secondary axle, only when a load imposed on the chassis exceeds a predetermined threshold, the suspension member dropping out of supportive engagement with the chassis and permitting all vehicle wheels to remain in ground contact when the imposed load is below the threshold, wherein the suspension member is a leaf spring coupled at its middle region to the secondary axle, and the upper portion of a slipper bracket has an inverted "U" vertical section parallel to the axles, the vertical sides thereof serving to locate the leaf spring laterally.

4. A wheeled vehicle in accordance with claim 1, wherein the said suspension member has a larger spring constant than that of the said rear axle spring.

5. A wheeled vehicle in accordance with claim 1, further comprising a Panhard rod coupled to the suspension member to control its transverse movement.

6. A wheeled vehicle in accordance with claim 1, further comprising damping means arranged to dampen movement of the free end of the suspension member.

7. A wheeled vehicle in accordance with claim 2, wherein the said suspension member has a larger spring constant than that of the said rear axle spring.

8. A wheeled vehicle in accordance with claim 2, further comprising a Panhard rod coupled to the suspension member to control its transverse movement.

9. A wheeled vehicle in accordance with claim 2, further comprising damping means arranged to dampen movement of the free end of the suspension member.

10. A wheeled vehicle in accordance with claim 3, wherein the said suspension member has a larger spring constant than that of the said rear axle spring.

11. A wheeled vehicle in accordance with claim 3, further comprising a Panhard rod coupled to the suspension member to control its transverse movement.

12. A wheeled vehicle in accordance with claim 3, further comprising damping means arranged to dampen movement of the free end of the suspension member.

* * * * *